(12) United States Patent
Valentin et al.

(10) Patent No.: US 8,259,380 B2
(45) Date of Patent: Sep. 4, 2012

(54) ELECTRODES OF ELECTROCHEMICAL/ELECTRICALLY-DRIVEN DEVICES

(75) Inventors: Emmanuel Valentin, Le Plessis Trevise (FR); Samuel Dubrenat, Paris (FR); Xavier Fanton, Aulnay sous Bois (FR)

(73) Assignee: Saint-Gobain Glass France, Courbevoie (FR)

( * ) Notice: Subject to any disclaimer, the term of this patent is extended or adjusted under 35 U.S.C. 154(b) by 1235 days.

(21) Appl. No.: 11/915,585

(22) PCT Filed: May 22, 2006

(86) PCT No.: PCT/FR2006/050465
§ 371 (c)(1), (2), (4) Date: Jan. 9, 2008

(87) PCT Pub. No.: WO2007/000542
PCT Pub. Date: Jan. 4, 2007

(65) Prior Publication Data
US 2008/0190759 A1    Aug. 14, 2008

(30) Foreign Application Priority Data
May 27, 2005    (FR) ..................................... 05 51391

(51) Int. Cl.
*G02F 1/15* (2006.01)
*G02F 1/03* (2006.01)
*G09G 3/19* (2006.01)
*H04N 9/16* (2006.01)

(52) U.S. Cl. ........... 359/265; 359/245; 345/49; 348/817

(58) Field of Classification Search .......... 359/265–275, 359/277, 245–247, 254, 242; 345/49, 105; 250/70; 348/814, 817; 438/929; 349/182–186
See application file for complete search history.

(56) References Cited

U.S. PATENT DOCUMENTS

| | | | | |
|---|---|---|---|---|
| 6,172,794 B1 * | 1/2001 | Burdis | ........................... | 359/269 |
| 7,626,748 B2 * | 12/2009 | Radmard et al. | .............. | 359/265 |
| 7,777,933 B2 * | 8/2010 | Piroux et al. | .................. | 359/265 |
| 2001/0030170 A1 | 10/2001 | Takaki et al. | | |
| 2003/0168096 A1 | 9/2003 | Ouchida et al. | | |

FOREIGN PATENT DOCUMENTS

| | | |
|---|---|---|
| FR | 2 791 147 | 9/2000 |
| FR | 2 857 617 | 1/2005 |
| WO | 93/05438 | 3/1993 |

OTHER PUBLICATIONS

U.S. Appl. No. 12/967,938, filed Dec. 14, 2010, Valentin, et al.
U.S. Appl. No. 12/374,050, filed Jan. 16, 2009, Valentin, et al.
U.S. Appl. No. 12/375,045, filed Jan. 26, 2009, Valentin, et al.

* cited by examiner

*Primary Examiner* — Dawayne A Pinkney
(74) *Attorney, Agent, or Firm* — Oblon, Spivak, McClelland, Maier & Neustadt, L.L.P.

(57) ABSTRACT

An electrochemical/electrocontrollable device having variable optical and/or energetic properties, including at least one carrier substrate including an electroactive layer or an electroactive layer stack arranged between a lower electrode and an upper electrode. At least one of the lower or upper electrodes includes at least four layers including at least one metal functional layer having intrinsic electrical conductivity properties, the functional layer being associated with an electrochemical barrier layer of an electrically conductive material transparent in the visible range, the electrochemical barrier layer being associated with a humidity protection layer of an electrically conductive material transparent in the visible range, and the functional layer being associated with a first sublayer of electrically conductive material transparent in the visible range.

17 Claims, 1 Drawing Sheet

ELECTRODES OF ELECTROCHEMICAL/ELECTRICALLY-DRIVEN DEVICES

Figure 1:
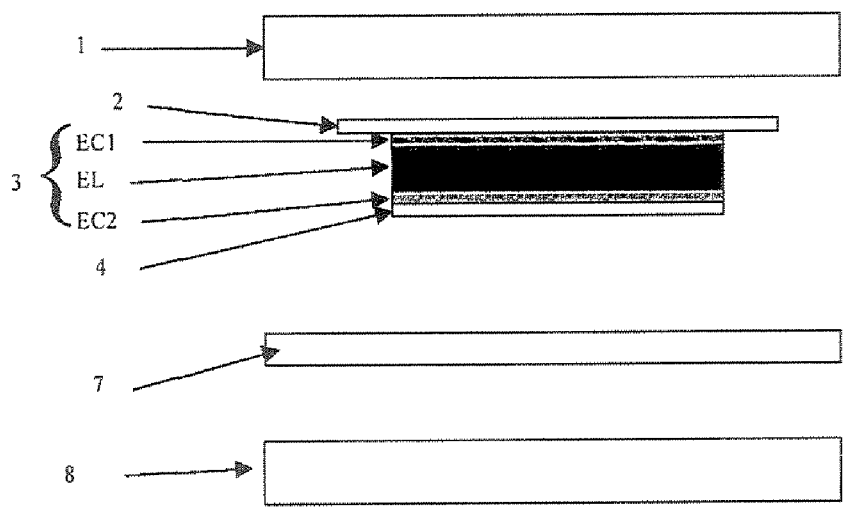

The present invention relates to an electrochemical and/or electrocontrollable device of the glazing type which has variable optical and/or energetic properties, or a photovoltaic device, or alternatively an electroluminescent device.

Specifically, there is nowadays an increased demand for so-called "intelligent" glazing which can adapt to the users' requirements.

There is also an increased demand for photovoltaic glazing, which makes it possible to convert solar energy into electrical energy, as well as for electroluminescent glazing which has advantageous applications in display equipment and as surfaces for illumination.

As regards "intelligent" glazing, this may involve controlling the delivery of sunlight through glazing fitted on the exterior of buildings or vehicles such as automobiles, trains or aircraft. The purpose is to be able to limit excessive heating inside the cockpits/rooms, but only in case of strong sunshine.

It may also involve controlling the degree of vision through glazing, particularly in order to darken it, render it diffusing or prevent any vision when so desired. This may relate to glazing fitted in rooms, trains, aircraft or fitted as automobile side windows. It also relates to the mirrors used as wing mirrors in order to avoid the driver being suddenly dazzled, or signaling panels so that messages appear when this is necessary or intermittently in order to attract more attention. Glazing which can be rendered diffusing at will may be used when so desired, for instance in projection screens.

As a variant, it may involve generating light by the glazing in order to control the level of luminosity or the color generated.

There are various electrocontrollable systems allowing these types of aspect/thermal property modifications.

In order to modulate the light transmission or light absorption by glazing, there are so-called viologen systems such as those described in U.S. Pat. No. 5,239,406 and EP-612 826.

In order to modulate the light transmission and/or thermal transmission of glazing, there are also so-called electrochromic systems. As is known, these generally comprise two electrochromic material layers separated by an electrolyte layer and framed by two electrically conductive layers. Each of these electrochromic material layers can reversibly insert cations and electrons, the modification of their oxidation state due to these insertions/deinsertions leading to a change in its optical and/or thermal properties. In particular, their absorption and/or their reflection at visible and/or infrared wavelengths can be modified.

It is customary to divide electrochromic systems into three categories:
  that in which the electrolyte is in the form of a polymer or a gel; for example, a polymer with protonic conduction such as those described in patents EP-253 713 or EP-670 346, or a polymer with lithium ion conduction such as those described in patents EP-382 623, EP-518 754 and EP-532 408; the other layers of the system are generally of inorganic nature,
  that in which the electrolyte is an essentially inorganic layer. This category is often referred to by the term "all solid" system, and examples of it can be found in patents EP-867 752, EP-831 360, patents WO.00/57243 and WO.00/71777,
  that in which all the layers are based on polymers, which category is often referred to by the term "all polymer" system.

There are also systems referred to as "optical valves". These are films comprising a polymer matrix, generally crosslinked, in which micro-droplets are dispersed containing particles which are capable of being placed along a privileged direction under the action of a magnetic or electric field. For instance, Patent WO.93/09460 discloses an optical valve comprising a polyorganosilane matrix and particles of the polyiodide type which intercept the light much less when a voltage is applied to the film.

So-called liquid crystal systems with a functionality similar to the previous ones may also be mentioned. These are based on the use of a film placed between two conductive layers and based on a polymer in which droplets of liquid crystals are arranged, in particular nematic liquid crystals with a positive dielectric anisotropy. When a voltage is applied to the film, the liquid crystals become oriented along a privileged axis, which allows vision. When there is no voltage, without alignment of the crystals, the film becomes diffusing and prevents vision. Examples of such films are described particularly in European Patent EP-0 238 164 and American patents U.S. Pat. No. 4,435,047, U.S. Pat. No. 4,806,922, U.S. Pat. No. 4,732,456. When laminated and incorporated between two glass substrates, this type of film is marketed by Saint-Gobain Vitrage under the brand name "Priva-Lite".

It is moreover possible to use all the liquid crystal devices known by the terms "NCAP" (Nematic Curvilinearly Aligned Phases) or PDLC (Polymer Dispersed Liquid Crystal).

It is also possible to use cholesteric liquid crystal polymers, such as those described in Patent WO.92/19695.

As regards electroluminescent systems, these comprise an organic or inorganic electroluminescent material or material stack supplied with electricity by electrodes.

A common feature of all these systems together is the need to be equipped with current feeds, which supply electrodes generally in the form of two electrically conductive layers on either side of the layer or various active layer(s) of the system.

These electrically conductive layers (which may in fact be a stack of layers) commonly comprise a layer based on indium oxide, generally tin-doped indium oxide better known by the abbreviation ITO. They may also be layers based on tin oxide doped for example with antimony, or based on zinc oxide doped for example with aluminum (or a mixture based on at least two of these oxides).

Document WO93/05438, for example, discloses an electrically conductive layer consisting of a thin metal layer based in particular on silver, copper, aluminum, which is associated with a layer based on a metallic blocker such as, for example, iron, zirconium, titanium, tungsten. This stack of the TCO type (transparent conductive oxide) is intended to be integrated in an electrochemical device of the electrochromic type, inside which the metallic blocker layer constitutes a barrier to diffusion of the Li+ ions between one of the active layers and the metal layer.

Furthermore, WO94/15247 discloses an electrically conductive layer with a structure similar to that previously described, which is supplemented with a layer based on a transparent conductive oxide such as, for example, zinc oxide or tin-doped indium oxide.

U.S. Pat. No. 5,510,173 and U.S. Pat. No. 5,763,063 moreover disclose a stack structure with energetic control incorporating a layer of silver or copper advantageously alloyed with a noble metal, for which protection in respect of corrosion is obtained by coating with a bilayer based on $In_2O_3$ and ITO or $ZnO_2/In_2O_3$ and ITO. In the case of using $ZnO_2$, application as an electrode is impossible owing to the insulating character of this oxide.

Furthermore, U.S. Pat. No. 6,870,656 describes a reflective electrode structure incorporating a layer based on an electrochemically stable alloy of silver and gold.

For every electrically conductive layer structure described above, its electrochemical stability is obtained only when this electrically conductive layer is alloyed.

ITO layers have been studied in particular. They can be easily deposited by magnetic field assisted cathodic sputtering, either from an oxide target (unreactive sputtering) or from a target based on indium and tin (reactive sputtering in the presence of an oxidizing agent such as oxygen). In order to present a sufficient electrical conductivity for the application and in order to be electrochemically robust, however, they require the application of a heat treatment step in situ or for finishing (often above 300° C.).

It is an object of the invention to be able to obtain an electrochemically robust assembly of electrically conductive layers for constituting the electrodes of electrochemical/electrocontrollable systems of the types previously described (electrochromic, photovoltaic, electroluminescent, etc.). It is a further aim to achieve this object with less cost and by avoiding the heat treatment steps, and without radically changing the known configurations of electrochromic systems which concern the invention. A more general object is to develop superior electrodes on an essentially transparent substrate (glass or polymeric material).

The invention relates to an electrochemical/electrocontrollable device having variable optical and/or energetic properties, comprising at least one carrier substrate provided with an electroactive layer or an electroactive layer stack arranged between a so-called "lower" electrode and a so-called "upper" electrode. According to the invention, at least one of the lower or upper electrodes comprises at least four layers including at least one metal functional layer having intrinsic electrical conductivity properties, said functional layer being associated with an electrochemical barrier layer of an electrically conductive material which is transparent in the visible range, said electrochemical barrier layer being associated with a humidity protection layer of an electrically conductive material which is transparent in the visible range and said functional layer being associated with a first sublayer of electrically conductive material which is transparent in the visible range.

Owing to this particular stack structure, a transparent electrode exhibiting an electrochemical stability compatible with electrocontrollable systems while having properties of high electrical conductivity can be obtained with less cost, and without resorting to a thermal finishing treatment. It is moreover to be noted that electrochemical systems with this type of stack structure have similar characteristics on the lower electrode and optionally on the upper electrode, in terms of coloration speed and homogeneity, as those using conventional electrodes of the prior art (mainly based on indium oxide, optionally doped). It is furthermore to be noted that the electrode obtained in this way is electrically conductive both in its thickness and over its surface.

In preferred embodiments of the invention, one and/or other of the following provisions may optionally be furthermore employed:
- the first sublayer is identical in nature to the electrochemical barrier layer,
- the electrochemical barrier layer is based on zinc oxide or a mixed oxide of zinc doped with another metal selected from the following family of metals: Al, Ga, B, So,
- the zinc oxide is of the ZnOx type with x less than 1, preferably lying between 0.88 and 0.98, in particular between 0.90 and 0.95,
- the functional layer is based on a pure material selected from silver or Cu or Zn or Al or Au or based on an alloy of this material containing in particular Al, Pt, Cu, Zn, Cd, In, Bo, Si, Zr, Mo, Ni, Li, Cr, Ga, Ge, Mg, Mn, Co, Sn, the humidity barrier layer being based on indium oxide doped in particular with tin, or tin oxide doped in particular with antimony,
- the first sublayer is associated with a second sublayer similar to the humidity barrier layer.

In the context of the invention, the term "lower" electrode is intended to mean the electrode which lies closer to the carrier substrate taken as a reference, on which at least some of the active layers are deposited (for example all the active layers in an "all solid" electrochromic system). The "upper" electrode is the one deposited on the other side, with respect to the same reference substrate.

Advantageously, the upper and/or lower electrode according to the invention has an electrical resistivity of between $10 \cdot 10^{-4}$ and $9 \cdot 10^{-5}$ ohm·cm, which makes its use as an electrode perfectly satisfactory.

Preferably, in particular in order to achieve this level of resistivity, it has a total thickness of between 160 and 320 nm.

The electrode remains transparent in these thickness ranges, that is to say it exhibits low absorption of light in the visible range. Nevertheless, it is not unfeasible to have much thicker layers (particularly in the case when the electroactive system of the electrochromic type functions in reflection rather than in transmission) or thinner layers (particularly when they are associated with another type of conductive layer, for example metallic, in the electrode).

As mentioned above, the invention may be applied to various types of electrochemical or electrocontrollable systems. It more particularly concerns electrochromic systems, particularly "all solid" or "all solid on polymer" or "all polymer" systems, or alternatively liquid crystal or viologen systems, or even electroluminescent systems.

The electrochromic systems or glazing to which the invention may be applied are described in the patents cited above. They may comprise at least one carrier substrate and a stack of functional layers successively comprising at least a first electrically conductive layer, an electrochemically active layer capable of reversibly inserting ions such as $H^+$, $Li^+$, $OH^-$ respectively of the anodic or cathodic electrochromic material type, an electrolyte layer, a second electrochemically active layer capable of reversibly inserting ions such as $H^+$, $Li^+$, $OH^-$ respectively of the cathodic or anodic electrochromic material type, and a second electrically conductive layer (the term "layer" is to be understood as meaning a single layer or a stack of a plurality of continuous or discontinuous layers).

The invention also relates to the incorporation of the electrochemical devices described in the preamble of the present application in glazing, which functions in reflection (mirror) or in transmission. The term "glazing" is to be understood in the broad sense, and covers any essentially transparent material made of glass and/or polymeric material (such as polycarbonate PC or polymethyl methacrylate PMMA). The carrier substrates and/or counter-substrates, that is to say the substrates framing the active system, may be rigid, flexible or semi-flexible.

If the glazing functions in reflection, it may in particular be used as an interior mirror or as a wing mirror.

The invention also relates to the various applications which may be found for these devices, glazing or mirrors: this may involve making glazing for buildings, particularly exterior glazing, interior partitions or glazed doors. It may also involve windows, roofs or interior partitions for means of transport such as trains, aircraft, automobiles, boats. It may also involve visualization or display screens such as projection screens, television or computer screens, touch-sensitive screens. They may also be used to make spectacles or camera lenses, or alternatively to protect solar panels. They may also be used as energy storage devices of the battery, fuel cell type, batteries and cells themselves.

Figure 2:
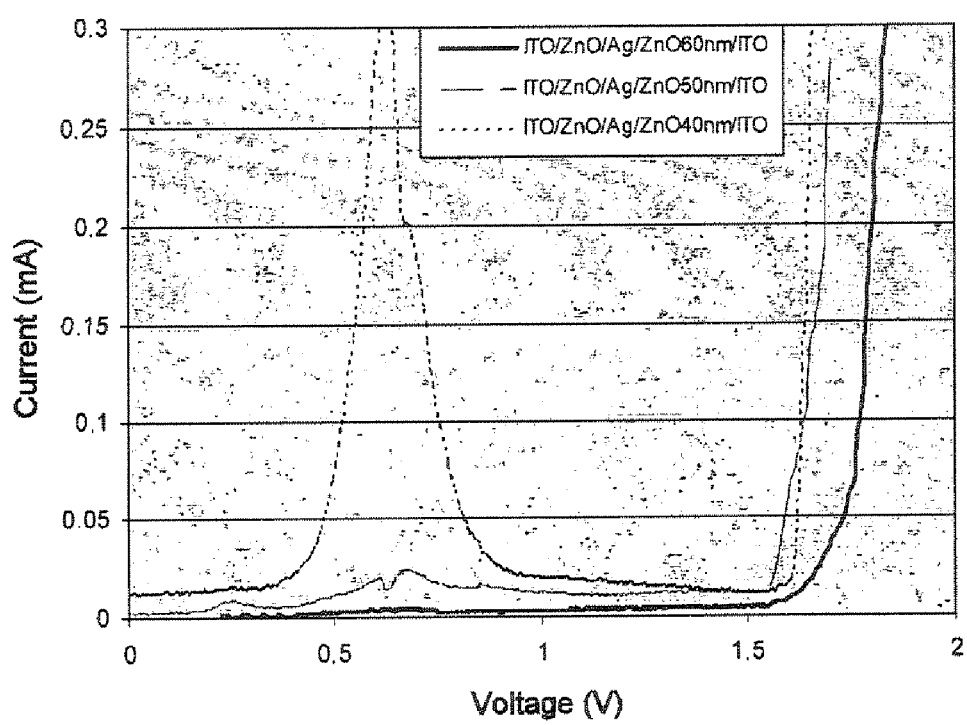

The invention will now be described in more detail with the aid of nonlimiting examples and figures:

FIG. 1: a schematic view in section of an electrochromic cell using an electrode according to the invention, FIG. 2 illustrates for various configurations of electrodes according to the invention their electrochemical protection.

FIG. 1 is deliberately very schematic and is not necessarily to scale, in order to make it easier to read: it represents a section of an "all solid" electrochromic device according to the teachings of the invention, successively comprising:

- a substrate of clear silica-soda-lime glass 1 with a thickness of 2.1 mm,
- a lower electrode 2 comprising a layer stack of the ITO/ZnO:Al/Ag/ZnO:Al/ITO type with respective thicknesses 15 to 20 nm for ITO/60 to 80 nm for ZnO:Al/3 to 15 nm for silver/60 to 80 nm for ZnO:Al/15 to 20 nm for ITO,
- an upper electrode 4 based on ITO or $SnO_2$:F,
- an electrochromic system 3 whose structure is described below,
- a PU sheet 7 making it possible to laminate the glass 1 with another glass 8 having the same characteristics as the glass 1. Optionally, the face of the glass 8 turned toward the PU sheet 7 is provided with a stack of thin layers having a solar protection function. This stack may in particular comprise two silver layers intercalated with dielectric layers, in a manner which is known.

The electrochromic system 3 comprises:

- a first anodic electrochromic material layer EC1 of (hydrated) iridium oxide measuring 40 to 100 nm or hydrated nickel oxide measuring 40 to 400 nm, optionally alloyed with other metals (as a variant, this layer may be replaced by an anodic electrochromic material layer of nickel oxide measuring 100 to 300 nm, optionally alloyed with other metals),
- a layer of tungsten oxide measuring 100 nm,
- a second layer of hydrated tantalum oxide or hydrated silicon oxide or hydrated zirconium oxide measuring 100 nm, these last two layers forming a layer with an electrolyte function EL,
- a second layer of cathodic electrochromic material EC2 based on tungsten oxide $WO_3$ measuring 370 nm.

All these layers were deposited by magnetic field assisted cathodic sputtering.

The electrochromic device described above constitutes Example 1.

Example 2 is given below; it is a structure known from the prior art and for which both the lower and upper electrodes are based on ITO or $SnO_2$:F.

EXAMPLE 2

Comparative=Standard EC

The electrochromic glazing EC has an identical composition to Example 1, except that the lower electrode 2 is based on ITO (tin-doped indium oxide) measuring 500 nm, deposited hot (350° C.).

As a variant, the upper electrode comprises other conductive elements: this may in particular involve associating the electrode with a layer more conductive than it, and/or with a plurality of conductive strips or wires. Reference will be made to the cited Patent WO00/57243 for more details about the implementation of such multi-component electrodes. A preferred embodiment of this type of electrode consists in a network of conductive wires, encrusted on the surface of a polymer sheet (which may then protect the active system and/or allow lamination of the glass-type carrier substrate with another glass in the case of fabricating electroactive glazing, for example of the electrochromic type), being applied onto the ITO layer.

Comparative tests were then carried out on the two electrochromic cells of Examples 1 and 2.

The most reliable validation of the TCOs consists in carrying out a durability test of the electrochromic cells by exposure to 80° C. in the colored state. In this context, the parameters representative of the degradation of the glazing EC are the change in the switching time (Vcom) and the contrast ($TL_{uncolored}/TL_{colored}$).

|  | Time (h) | V com (s) | Contrast |
|---|---|---|---|
| Example 2 (std EC) | 0 | 6 | 6.5 |
|  | 1500 | 12 | 4.6 |
| Example 1 | 0 | 5 | 7.1 |
|  | 1500 | 15 | 5 |

The table above indicates that the switching time (Vcom) and the contrast experience a similar change on the standard sample (with the 500 nm lower electrode of hot ITO) and on the sample incorporating the multilayer TCO. The use of the multilayer TCO is therefore perfectly compatible with use in electrochromic glazing.

Optical Measurement

| Optical | colored state | | | | uncolored state | | | |
|---|---|---|---|---|---|---|---|---|
| measurement | $T_L$ | $R_L$ | a* | b* | $T_L$ | $R_L$ | a* | b* |
| Example 2 (std EC) | 56.3 | 8.74 | −3 | 8.5 | 8.6 | 9.49 | −7 | −16.2 |
| Example 1 | 32.5 | 29.4 | −7.1 | 8.5 | 4.6 | 26.6 | −9.5 | −11.8 |

The optical results show (for a TCO incorporating an Ag layer with a thickness of 12 nm) a loss of TL as well as an increase in the reflection. This greater light absorption is perfectly acceptable for the automobile roof application, where the TL level expected by the customer is at most 40%.

Other examples illustrating other embodiments of the invention are given below.

EXAMPLE 3

According to a variant of the invention forming the subject matter of Example 3, it substantially repeats the structure of the stack in FIG. 1 except as regards the nature of the lower electrode 2 and upper electrode 4. Specifically, both of them comprise a layer stack of the ITO/ZnO:Al/Ag/ZnO:Al/ITO type with respective thicknesses 15 to 20 nm for ITO/60 to 80 nm for ZnO:Al/3 to 15 nm for silver/60 to 80 nm for ZnO:Al/15 to 20 nm for ITO. This configuration makes it possible to obviate the wire network, the conduction of the TCO being equivalent to that of the ITO+wire assembly.

Other exemplary embodiments of the invention are given below. The following table collates the electrical and optical characteristics of different multilayer TCOs complying with various applications.

| Multiple layer | Rsq | Ttot (nm) | ρ(Ω·cm) | TL | RL | Abs |
|---|---|---|---|---|---|---|
| $ITO_{20}/ZnO:Al_{60}/Ag_{12}/ZnO:Al_{60}/ITO_{20}$ | 4.6 | 172 | 7.91E–05 | 49.6 | 39.9 | 10.5 |
| $ITO_{15}/ZnO:Al_{60}/Ag_{12}/ZnO:Al_{60}/ITO_{15}$ | 5.3 | 162 | 8.58E–05 | 54 | 31.9 | 14.1 |
| $ITO_{20}/ZnO:Al_{60}/Ag_{6}/ZnO:Al_{60}/ITO_{20}$ | 14 | 168 | 2.3E–04 | 65.3 | 25.4 | 9.3 |
| $ITO_{20}/ZnO:Al_{60}/Ag_{3}/ZnO:Al_{60}/ITO_{20}$ | 60 | 165 | 9.9E–04 | 65.1 | 12.6 | 22.3 |
| $ITO_{20}/ZnO:Al_{130}/Ag_{3}/ZnO:Al_{130}/ITO_{20}$ | 25 | 303 | 7.57E–04 | 57.5 | 14.8 | 27.7 |

In the table above: Ttot: total thickness, ρ: effective resistivity of the stack and Rsq.=ρ/Ttot in Ω/square. Furthermore, TL: light transmission in %, RL: light reflection, Abs=100–RL–TL.

The inventors have found that the electrochemical protection of the barrier layer is determined by the thickness of the electrochemical barrier layer. The inventors have thus been able to determine that a minimum thickness of 60 nm ZnO:Al is necessary in order to protect the Ag. This is illustrated in FIG. 2 where a TCO comprising 12 nm of Ag experiences an oxidation cycle with the aid of a so-called "three electrode" setup having a working electrode (TCO studied), a reference electrode (saturated calomel electrode) and a counter-electrode (glass+500 nm ITO) which are immersed in an $H_3PO_4$ liquid electrolyte (orthophosphoric acid).

According to another alternative embodiment intended particularly for use with an electrocontrollable system of the electroluminescent type:

Distinction is made between a first family, in which the organic electroluminescent material of the thin layer consists of evaporated molecules (ODELs) such as, for example, $AlQ_3$ (tris(8-hydroxyquinone) aluminum), DPVBi (4,4'-(diphenyl vinylene biphenyl)), DMQA (dimethyl quinacridone) or DCM (4-(dicyanomethylene)-2-methyl-6-(4-dimethylaminostyryl)-4H-pyran). In this case, additional layers promoting the transport of electrical carriers (holes and electrons) are associated on each of the faces of the thin layer, these additional layers respectively being referred to as "HTL" and "ETL" for "hole transporting layer" and "electron transporting layer". In order to improve the injection of the holes into the HTL layer, it is furthermore associated with a layer referred to as "HIL" for "hole injection layer" consisting, for example, of copper or zinc phthalocyanine, A second family, in which the organic electroluminescent material of the thin layer consists of polymers (pLEDs) such as, for example, PPV for poly(para-phenylene vinylene), PPP (poly(para-phenylene)), DO-PPP (poly(2-decyloxy-1,4-phenylene)), MEH-PPV (poly[2-(2'-ethylhexyloxy)-5-methoxy-1,4-phenylene vinylene]), CN-PPV (poly[2,5-bis(hexyloxy)-1,4-phenylene-(1-cyanovinylene)]) or PDAFs (poly(dialkylfluorenes)), the polymer layer likewise being associated with a layer which promotes the injection of holes (HIL), consisting for example of PEDT/PSS (poly(3,4-ethylene-dioxythiophene)/poly(4-styrene sulfonate)), A third family, in which the inorganic electro-luminescent material of the thin layer consists of a thin layer of a luminophore, for example sulfides such as for example ZnS:Mn or SrS:Ce or oxides such as $Zn_2SiO_4$:Mn, $Zn_2GeO_4$:Mn or $Zn_2Ga_2O_4$:Mn. In this case, an insulating layer made from a dielectric material, conventionally for example $Si_3N_4$, $BaTiO_3$ or $Al_2O_3/TiO_2$, is associated with each of the faces of the electroluminescent thin layer, A fourth family, in which the inorganic electroluminescent layer consists of a thick layer of a luminophore such as, for example, ZnS:Mn or ZnS:Cu, this layer being associated with an insulating layer of dielectric material, for example $BaTiO_3$, these layers generally being produced by screen printing.

Whatever the type of electroluminescent system, organic or inorganic, in thin or thick layers, the layer stack comprising in particular the electroluminescent layer is associated on either side of the insulating layers HTL, ETL, HIL with two electrodes (a cathode and an anode in the case of organic systems).

These electrodes are similar to those already envisaged for electrocontrollable systems of the electrochromic type as described above.

It may nevertheless be necessary to render one of these electrodes reflective and, to this end, the thickness of the functional layer with electrical conductivity properties is increased. The thicknesses of each of the layers forming the stack for the two types of electrode are given below:

Electrode E1: 15 to 20 nm for ITO/60 to 80 nm for ZnO:Al/6 to 12 nm for silver/60 to 80 nm for ZnO:Al/15 to 20 nm for ITO.

Electrode E2: 15 to 20 nm for ITO/60 to 80 nm for ZnO:Al/40 nm minimum for silver/60 to 80 nm for ZnO:Al/15 to 20 nm for ITO.

This electrode structure according to the invention is integrated within a stack of the electroluminescent type according to the following configuration: E1/(Si3N4 (300 nm)/luminophore (500 nm)/Si3N4 (300 nm))/E2

The invention also relates to the substrate provided with at least one electrode of the type described above, independently of the electrical/electrochemical device in which it is incorporated or intended to be incorporated, as well as the lower or upper electrode per se.

The invention claimed is:

1. An electrochemical/electrocontrollable device having variable optical and/or energetic properties, comprising:
    at least one carrier substrate including an electroactive layer or an electroactive layer stack arranged between a lower electrode and an upper electrode,
    wherein at least one of the lower or upper electrodes includes at least four layers including at least one metal functional layer having intrinsic electrical conductivity properties, the functional layer being associated with an electrochemical barrier layer of an electrically conductive material that is transparent in the visible range, the electrochemical barrier layer being associated with a humidity protection layer of an electrically conductive material that is transparent in the visible range, and the functional layer being associated with a first sublayer of electrically conductive material that is transparent in the visible range, the functional layer being based on a pure material selected from Ag or Cu or Zn or Al or Au.

2. The electrochemical device as claimed in claim 1, wherein the first sublayer is identical in nature to the electrochemical barrier layer.

3. The electrochemical device as claimed in claim 1, wherein the electrochemical barrier layer is based on zinc oxide or a mixed oxide of zinc doped with another metal selected from the following family of metals: Al, Ga, B, Sc.

4. The electrochemical device as claimed in claim 3, wherein the zinc oxide is of ZnOx with x less than 1, or between 0.88 and 0.98, or between 0.90 and 0.95.

5. The electrochemical device as claimed in claim 1, wherein the humidity protection layer is based on indium oxide doped with tin, or tin oxide doped with antimony.

6. The electrochemical device as claimed in claim 1, wherein the first sublayer is associated with a second sublayer similar to the humidity protection layer.

7. The electrochemical device as claimed in claim 5, in addition to the layer based on doped indium oxide, the upper electrode also includes at least one other electrically conductive layer and/or a plurality of conductive strips or conductive wires.

8. The electrochemical device as claimed in claim 1, as an electrochromic system, or an all solid electrochromic system, or an all solid on polymer electrochromic system, or an all polymer electrochromic system, or a liquid crystal system, or a viologen system, or an electroluminescent system.

9. The electrochemical device as claimed in claim 1, wherein the at least one of the lower or upper electrodes has a layer stack of ITO/ZnO:Al/Ag/ZnO:Al/ITO type.

10. The electrochemical device as claimed in claim 9, wherein the thickness of the silver layer lies between 3 and 15 nm, or between 6 and 12 nm.

11. The electrochemical device as claimed in claim 9, wherein the thickness of the silver layer lies between 30 and 50 nm.

12. The electrochemical device as claimed in claim 9, wherein the thickness of the ZnO layer lies between 60 and 150 nm.

13. The electrochemical device as claimed in claim 9, wherein the thickness of the ITO layer lies between 10 and 30 nm, or between 15 and 20 nm.

14. A glazing, incorporating the electrochemical device as claimed in claim 1.

15. A mirror, incorporating the electrochemical device as claimed in claim 1, with a functional layer thickness of at least 40 nm.

16. Use of the electrochemical device as claimed in claim 1 to make a glazing for buildings, a glazing fitted in interior partitions or windows or roofs or fitted in an aircraft, trains, automobiles, boats, visualization/display screens, computer or television screens, or projection screens, touch-sensitive screens, for making spectacles or camera lenses or solar panel protection, or surfaces for illumination.

17. A method for obtaining the electrochemical device as claimed in claim 1, wherein at least one of the layers forming the lower or upper electrode is deposited by magnetic field assisted cathodic sputtering, at room temperature.

\* \* \* \* \*

UNITED STATES PATENT AND TRADEMARK OFFICE
CERTIFICATE OF CORRECTION

PATENT NO. : 8,259,380 B2
APPLICATION NO. : 11/915585
DATED : September 4, 2012
INVENTOR(S) : Emmanuel Valentin et al.

It is certified that error appears in the above-identified patent and that said Letters Patent is hereby corrected as shown below:

Column 3, line 15, change "300° C.)." to "300° C)."

Column 3, line 64, change "So" to "Sc"

Column 5, line 65, change "(350° C.)." to "(350° C)."

Column 6, line 15, change "80° C." to "80° C"

Column 7, line 57, change "electro-luminescent" to "electroluminescent"

Signed and Sealed this
Twenty-seventh Day of November, 2012

David J. Kappos
*Director of the United States Patent and Trademark Office*